(12) United States Patent
Naveh et al.

(10) Patent No.: US 12,731,063 B2
(45) Date of Patent: Sep. 8, 2026

(54) AUTOMATIC QUANTUM CIRCUIT CONTROL SKIPS

(71) Applicant: Classiq Technologies LTD., Tel Aviv (IL)

(72) Inventors: Amir Naveh, Haifa (IL); Shmuel Ur, Shorashim (IL); Peleg Emanuel, Tel Aviv (IL); Ravid Alon, Tel Aviv (IL); Ofek Kirzner, Haifa (IL); Eyal Cornfeld, Ramat Gan (IL)

(73) Assignee: Classiq Technologies LTD., Tel Aviv (IL)

( * ) Notice: Subject to any disclaimer, the term of this patent is extended or adjusted under 35 U.S.C. 154(b) by 703 days.

(21) Appl. No.: 18/201,381

(22) Filed: May 24, 2023

(65) Prior Publication Data

US 2024/0394580 A1 Nov. 28, 2024

(51) Int. Cl.
*G06N 10/40* (2022.01)

(52) U.S. Cl.
CPC .................................... *G06N 10/40* (2022.01)

(58) Field of Classification Search
USPC .......................................................... 716/100
See application file for complete search history.

(56) References Cited

U.S. PATENT DOCUMENTS

| | | | | |
|---|---|---|---|---|
| 11,288,589 | B1 | 3/2022 | Naveh et al. | |
| 11,373,114 | B1 | 6/2022 | Naveh et al. | |
| 2023/0111039 | A1 | 4/2023 | Naveh et al. | |
| 2023/0111924 | A1 | 4/2023 | Naveh et al. | |
| 2023/0112525 | A1 | 4/2023 | Naveh et al. | |
| 2023/0289638 | A1 * | 9/2023 | Peterson ................ | G06N 10/20 |

* cited by examiner

*Primary Examiner* — Bryce M Aisaka
(74) *Attorney, Agent, or Firm* — Myers Wolin, LLC

(57) ABSTRACT

A method, a computerized apparatus, and a computer program product for automatic quantum circuit control skips. The method comprises obtaining a controlled sequence of quantum operations defining a complete order with at least two computation-uncomputation pairs of operations separated by a sub-sequence of one or more quantum operations. Computation-uncomputation pairs to be reduced are selected based on an optimization of a score of the reduced control sequence in comparison to a score of an alternative reduced control sequence in which the pairs are not reduced, in accordance with a score of each operation in a respective quantum circuit control. A reduced control sequence with a reduced number of controls is obtained by excluding a selected computation-uncomputation pairs of operations.

15 Claims, 7 Drawing Sheets

AUTOMATIC QUANTUM CIRCUIT CONTROL SKIPS

TECHNICAL FIELD

The present disclosure relates to quantum computing in general, and to automatic quantum circuit control skips, in particular.

BACKGROUND

Quantum computing is a computational paradigm that is fundamentally different from classical computing. In contrast to classical computing, which utilizes bits, quantum computing utilizes qubits. The qubits have unique features, as each qubit can be in superposition, several qubits can be entangled, and all operations on qubits besides measurement, referred to as quantum gates, must be reversible. Temporarily computed values are stored on additional helper qubits, referred to as auxiliary qubits.

A quantum gate is a basic quantum circuit operating on a small number of qubits. Quantum gates are the building blocks of quantum circuits like classical logic gates are for conventional digital circuits. Quantum gates are unitary operators and are represented as unitary matrices relative to some basis. As unitary operations are reversible quantum gates are reversible by definition. The most common quantum gates operate on vector spaces of one or two qubits, just like the common classical logic gates operate on one or two bits.

One type of quantum gates is controlled gates. Controlled gates act on two or more qubits, where one or more qubits act as a control for some operation, e.g., performing the operation on the target qubit only the if the control qubit is $|1\rangle$, and otherwise leaves the target qubit unchanged. Control can be extended to gates with an arbitrary number of qubits and functions in programming languages. In particular, control can be extended to any quantum circuit or any combination of quantum operations.

BRIEF SUMMARY

One exemplary embodiment of the disclosed subject matter is a method comprising: obtaining a sequence of quantum operations, each operation is a tuple of a gate and an ordered sequence of qubits on which the gate operates, the sequence of quantum operations defines a complete order between the quantum operations, the quantum operations comprise at least two computation-uncomputation pairs of operations separated by a sub-sequence of one or more quantum operations, the sequence of quantum operations is part of a quantum circuit control of a quantum circuit: reducing a number of controls of the quantum circuit by excluding a first computation-uncomputation pair of operations from the quantum circuit control and without excluding the second computation-uncomputation pair of operations from the quantum circuit control, whereby obtaining a reduced control sequence, wherein said reducing the number of controls comprises selecting between reducing the first computation-uncomputation pair and between reducing the second computation-uncomputation pair based on an optimization of a score of the reduced control sequence in comparison to a score of an alternative reduced control sequence in which the second computation-uncomputation pair of operations is reduced and the first computation-uncomputation pair of operations is not reduced, wherein the score is determined based on a score of each operation in a respective quantum circuit control; and outputting a quantum circuit with the reduced number of controls of the quantum circuit.

Optionally, the first computation-uncomputation pair and the second computation-uncomputation pair intersect.

Optionally, the first computation-uncomputation pair comprises a first operation and a second operation, the second operation is an inverse operation to the first operation, the second computation-uncomputation pair comprises the first operation and a third operation, the third operation is an inverse operation to the first operation, the sub-sequence of the first computation-uncomputation pair includes the third operation or the sub-sequence of the second computation-uncomputation pair includes the second operation, whereby due to exclusion of the first computation-uncomputation pair, the second computation-uncomputation pair cannot be excluded.

Optionally, the first computation-uncomputation pair comprises a first operation and a second operation, the second operation is an inverse operation to the first operation, the second computation-uncomputation pair comprises a third operation and a fourth operation, the fourth operation is an inverse operation to the third operation, the sub-sequence of the first computation-uncomputation pair includes the third operation or the fourth operation, the sub-sequence of the second computation-uncomputation pair includes the first operation or the second operation.

Optionally, the sequence of quantum operations comprises n quantum operations denoted as $o_1, o_2, \ldots, o_n$, wherein said reducing comprises computing $S_{1,n}$, wherein $S_{i,j}$ is a score indicating maximal utility from skipping operations in the control sequence defined by a sub-sequence of $o_i, o_{i+1}, \ldots, o_j$, wherein $S_{1,n}$ is computed based on a summation of $S(o_i)$ for each skipped operation $o_i$ in the control sequence, wherein $S(o_i)$ is a score defined for skipping the operation $o_i$ in the control sequence.

Optionally, $S_{i,j}$ is computed according to one of the following:

$$S_{i,j} = \max\left\{S_{i+1,j,}, S(o_i) + \max_{k\in[i+1,j]\ and\ o_k=o_i-1} S_{i+1,k-1} + S_{k+1,j,}\right\}, \text{ and}$$

$$S_{i,j} = \max\left\{S_{i,j-1,}, S(o_j) + \max_{k\in[i,j-1]\ and\ o_k=o_i-1} S_{i,k-1} + S_{k,j-1,}\right\}.$$

Optionally, the $S(o_i)$ score is different for different quantum operations that is defined based on a reduction in quantum resources when skipping operation $o_i$ from the control of the quantum circuit.

Optionally, said obtaining the sequence of quantum operations comprises:

- selecting the sequence of quantum operations based on partial order defined by a quantum program defining the quantum circuit, wherein the quantum program defines a set of alternative sequences in view of commuting quantum operations.

Optionally, said selecting comprises: obtaining a circuit Directed Acyclic Graph (DAG) based on the quantum program, wherein each node in the circuit-DAG represents a quantum operation, each directed edge in the circuit-DAG from a first node to a second node represents that the operation represented by the second node immediately follows the operation represented by the first node in the quantum circuit; constructing, based on the circuit-DAG, a commutation-DAG of the quantum circuit, the commutation-DAG represents partial order between quantum operations of the quantum circuit in view of commutation property of quantum operations pairs: selecting a sequence of the quantum operations based on the partial order defined by the commutation-DAG.

Optionally, said selecting is performed using a solver that is configured to solve a selection problem from potential alternative sequences defined by the commutation-DAG, wherein the solver is configured to select the sequence so as to optimize a target function that is based on a score of the selected sequence, the score of the selected sequence is defined based on a score of the potential alternative sequences, the score is determined based on a score of each operation skipped in a respective quantum circuit control in a circuit that is defined based on the potential alternative sequences.

Optionally, the solver is at least one of a Constraint Satisfaction Problem (CSP) solver and an integer programming problem solver.

Optionally, said constructing comprises generating a maximal edges circuit-DAG based on the circuit-DAG, the maximal edges circuit-DAG is a closure of the circuit-DAG, wherein the commutation-DAG is constructed by removing edges from the maximal edges circuit-DAG based on commutation property of operations of nodes connected by the edges.

Optionally, the method further comprises reducing a set of basis gates in the sequence.

Another exemplary embodiment of the disclosed subject matter is a computerized apparatus having a processor, the processor being adapted to perform the steps of: obtaining a sequence of quantum operations, each operation is a tuple of a gate and an ordered sequence of qubits on which the gate operates, the sequence of quantum operations defines a complete order between the quantum operations, the quantum operations comprise at least two computation-uncomputation pairs of operations separated by a sub-sequence of one or more quantum operations, the sequence of quantum operations is part of a quantum circuit control of a quantum circuit: reducing a number of controls of the quantum circuit by excluding a first computation-uncomputation pair of operations from the quantum circuit control and without excluding the second computation-uncomputation pair of operations from the quantum circuit control, whereby obtaining a reduced control sequence, wherein said reducing the number of controls comprises selecting between reducing the first computation-uncomputation pair and between reducing the second computation-uncomputation pair based on an optimization of a score of the reduced control sequence in comparison to a score of an alternative reduced control sequence in which the second computation-uncomputation pair of operations is reduced and the first computation-uncomputation pair of operations is not reduced, wherein the score is determined based on a score of each operation in a respective quantum circuit control; and outputting a quantum circuit with the reduced number of controls of the quantum circuit.

Yet another exemplary embodiment of the disclosed subject matter is a computer program product comprising a non-transitory computer readable storage medium retaining program instructions, which program instructions when read by a processor, cause the processor to perform a method comprising: obtaining a sequence of quantum operations, each operation is a tuple of a gate and an ordered sequence of qubits on which the gate operates, the sequence of quantum operations defines a complete order between the quantum operations, the quantum operations comprise at least two computation-uncomputation pairs of operations separated by a sub-sequence of one or more quantum operations, the sequence of quantum operations is part of a quantum circuit control of a quantum circuit: reducing a number of controls of the quantum circuit by excluding a first computation-uncomputation pair of operations from the quantum circuit control and without excluding the second computation-uncomputation pair of operations from the quantum circuit control, whereby obtaining a reduced control sequence, wherein said reducing the number of controls comprises selecting between reducing the first computation-uncomputation pair and between reducing the second computation-uncomputation pair based on an optimization of a score of the reduced control sequence in comparison to a score of an alternative reduced control sequence in which the second computation-uncomputation pair of operations is reduced and the first computation-uncomputation pair of operations is not reduced, wherein the score is determined based on a score of each operation in a respective quantum circuit control; and outputting a quantum circuit with the reduced number of controls of the quantum circuit.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
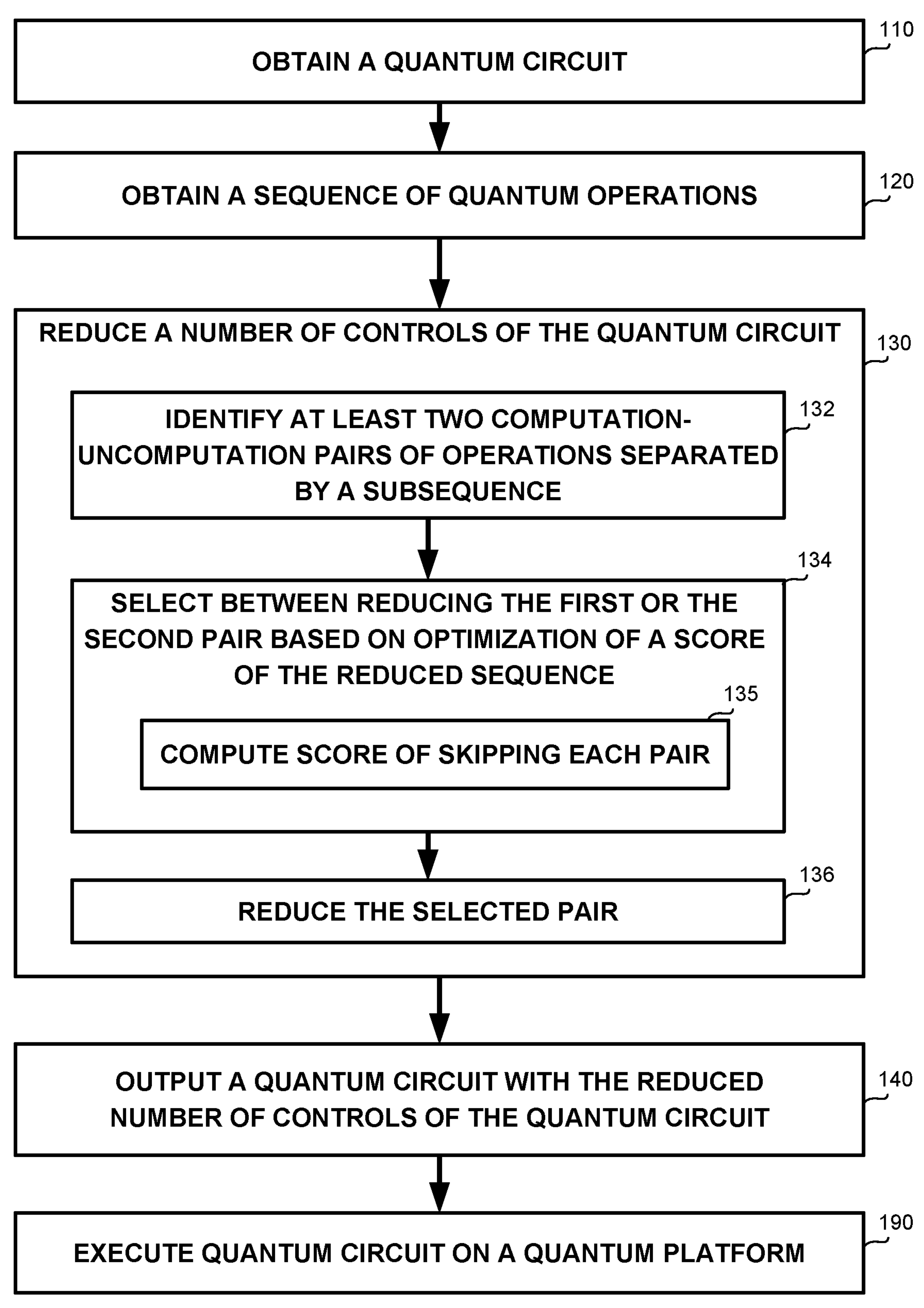
FIGS. 1A-1D show flowchart diagrams of methods, in accordance with some exemplary embodiments of the disclosed subject matter.

One technical problem dealt with by the disclosed subject matter is reducing the number of control gates in controlled quantum circuits. Quantum circuit control is an important capability of quantum computers, being a key part of many quantum algorithms, such as Shor's algorithm, Quantum Phase Estimation (QPE), or the like. However, controlling circuits may require replacing gates with larger ones, such as replacing the gates with gates that operate on the controlling qubits as well, e.g., gates that operate on at least one additional qubit. Multiple qubit gates may be harder to perform and may have lower fidelities. Hence, a common goal in designing efficient quantum algorithms may be to design the algorithms with as few two-qubit gates as possible.

In some exemplary embodiments, quantum identities may be utilized in order to reduce the number of controls, such as using identities involuting computation-uncomputation operations, which may be skipped in control, e.g., because only one of the computation-uncomputation operations may be performed regardless of the value of the control qubit. As an example, an operation and its inverse may be usually regarded as a computation-uncomputation pair. Accordingly, the identity ctrl($V^\dagger UV$)=$V^\dagger$ctrl(U) V may be utilized reduce the number of controls, where $V^\dagger$ is the inverse operation of V. Such structure may be prevalent in quantum algorithms. However, quantum algorithms may comprise more complicated expressions that comprise multiple computation-uncomputation pairs. As control is a distributive operation (i.e., ctrl(AB)=ctrl(A)ctrl(B)), multiple options of control skipping may be valid. As an example, the expression ctrl ($V_1^\dagger V_2^\dagger UV_1V_2$), which comprises two computation-uncomputation pairs: $V_1^\dagger$,$V_1$ and $V_2^\dagger V_2$, the number of gates on which the control applies may be reduced in two options: ctrl($V_1^\dagger V_2^\dagger UV_1V_2$)=$V_1^\dagger$ctrl($V_2^\dagger$U) $V_1$ctrl($V_2$); or ctrl ($V_1^\dagger V_2^\dagger UV_1V_2$)=ctrl ($V_1^\dagger$)$V_2^\dagger$ctrl($UV_1$) $V_2$. In the first option, the $V_1$ may be skipped. In the second option, $V_2$ pair may be skipped. However, in case the operations $V_1$ and $V_2$ do not commute, it may be impossible to skip both of them, and it may be required to select between the two options to implement this circuit more efficiently. In some exemplary embodiments, the two options may both be checked to select the best one according to the cost of implementation, such as in terms of execution time, error, or the like.

Additionally or alternatively, quantum circuits may be described as a multiplication of unitaries. Unitaries may be basis gates, acting on a limited set of qubits and trivially on the rest. In such a case, the general problem of quantum circuit control reduction may be formulated as identifying computation-uncomputation pairs whose controls may be skipped. However, the problem may become more complicated when the quantum circuit is described as a larger multiplication of unitaries or operations. Some operations may appear more than once and the order may be much more complex. Additionally or alternatively, even when at a logical level the general problem of quantum circuit control reduction can be simplified as identification of $V^\dagger UV$ structure in the quantum sequence representing the quantum circuit: at the gate level, computation-uncomputation pairs may be frequent, and the optional control skip options may numerous, beyond the capabilities of any individual to count and compare. As an example, two X gates operating on the same qubit may be skipped. As another example, any order-2 gate Z, H, CX, or the like, operating on the same qubits in the same order, may be skipped.

One technical solution is to neglect commutation properties between quantum operations and reduce the number of controls within a single sequence of quantum operations defining a complete order between the quantum operations. In some exemplary embodiments, multiple sequences of quantum operations with different orders between the quantum operations of the same quantum circuit may be achieved due to commutation properties of the operations. Neglecting commutation, i.e., predefining or selecting a certain order between the quantum operations of the controlled circuit problem, may simplify the problem of reducing the number of control gates. In such a case where the order is predefined, the problem may be equivalent to the selection of control pairs to be skipped in a single sequence of operations representing the quantum circuit that defines a predetermined order of operations.

In some exemplary embodiments, the selection of computation-uncomputation pairs of operations to be excluded from the sequence of operations may be performed based on an optimization of a score of the reduced control sequence in comparison to a score of an alternative reduced control sequence in which different computation-uncomputation pairs of operations are reduced.

In some exemplary embodiments, each operation in the sequence of operations representing the quantum circuit may be represented as a tuple of a gate and an ordered sequence of qubits on which the gate operates. The inverse of an operation may be the inverse of the respective gate on the ordered sequence of qubits. Each operation in the sequence of operations representing the quantum circuit may be assigned a score. The optimized score of the optimized sequence may be determined based on the score of each operation in a respective quantum circuit control. The score S ($o_i$) of the $i^{th}$ operation, $o_i$, in the sequence may be determined based on the complexity of the operation, the type of the gate, the number of qubits on which the gate operates, the cost of controlling the operation, or the like.

It may be noted that when a computation-uncomputation pair of operations is selected to be skipped, the operations comprised by the pair cannot be skipped with other operations, and operations between the pair of operations cannot be skipped with operations outside the pair of operations. For example, in a geometrical interpretation of the problem (see, for example, FIG. 2), a computation-uncomputation pair of operations to be skipped may be logically represented as being connected by an arc. Skipping an additional computation-uncomputation pair of operations may be enabled only if the respective arc thereof does not cross a previous arc. For example, if the pair of operations being skipped are $O_i$, $O_j$ (i<j), then other pairs of operations $O_{i'}$, $O_{j'}$ (i'<j') cannot be skipped if i'<=i<=j'<=j. Similarly, pairs of operations in which i<=i'<=j<=j' cannot be skipped as well. In some cases, pairs of operations in which j'<i, or j<i', or j<i'<j' j may still be skipped.

In some exemplary embodiments, the problem of the optimal computation-uncomputation pairs selection may be solved recursively based on a determination of an optimal score for the selection of each possible computation-uncomputation pair: thereby splitting the solution for the sequence into sub-problems relating to subsequences. For example, the sequence may be split into three subsequences: the subsequence between the selected pair, and the two subsequences before the first operation and after the second operation. In some exemplary embodiments, the score $S_{ij}$ may represent the optimal score for an optimal selection of control pairs to be skipped in the index range [i, j] of the sequence of operations. The optimal score of the sequence of operations $S_{0,n-1}$, i.e. the sequence in the index range [0, n−1], may be solved recursively by:

$$S_{0,n-1} = \max_{i\in[0,n-1]\ and\ j\in[i+1,n-1]}\left\{S_{i+1,j,}, S(o_i) + \max_{k\in[i+1,j]\ and\ o_k=o_i-1} S_{i+1,k-1} + s_{k+1,j,}\right\}.$$

In some cases, $S_{i,j}$ may be defined as:

$$S_{i,j} = \max\left\{S_{i+1,j,}, S(o_i) + \max_{k\in[i+1,j]\ and\ o_k=o_i-1} S_{i+1,k-1} + S_{k+1,j,}\right\}.$$

The number of max-computations may be limited by the number of possible ranges [i, j], which is in an order of $O(n^2)$. Accordingly, the computation complexity of such solution, in the worst case, may be $O(n^2)$ computation time.

It is noted that other solution may be implemented, by splitting the sequence into a different set of sequences, using different formulas for $S_{ij}$ score, without using explicit recursion, using a loop instead of recursion, or the like.

For the avoidance of doubt, the term "optimal" used throughout the present disclosed subject matter should not be construed as the objectively best, most desirable or most satisfiable. Instead, and as an example, the term optimal solution may be with respect to a specific function, so that the optimal solution is a one for which a highest score (e.g., the function) is computed. It is noted that the disclosed subject matter should be construed to also cover solutions in which a solution from a top set of solutions is selected, such as a solution from the top 1% of potential solutions, from the 5% of potential solutions, or the like.

Another technical solution is to generalize the technical solution of selection of control pairs to be skipped in a single sequence of operation with a predefined ordered of operations, to a solution considering commutation properties between operations, by selecting an optimal order between operations according to commutation properties, that provides an optimal computation-uncomputation pairs selection.

In some exemplary embodiments, similar to representing a complete order between the operations by a sequence of operations, multiple sequence defining partial order of the operations of a quantum circuit, in accordance with commutations properties, may be represented using a commutation-DAG. (See, for example, FIG. 3B). The commutation-DAG may be constructed for the quantum circuit, based on the circuit-DAG representing the circuit, and in accordance with commutations properties of the operations. The circuit-DAG may be a graph representing the quantum circuit, where a directed edge is added for two operations if one must follow the other. In some cases, edges may represent operations that directly (e.g., immediately) follow one another. Additionally, or alternatively, edges may represent operations that directly or indirectly follow one another, i.e., representing transitive relationship. The circuit-DAG may be commonly used to analyze quantum circuits. The commutation-DAG may be constructed by removing edges between commuting operations in a respective complete graph. The commutation-DAG may be configured to imposes a partial order on the operations of the quantum circuit: A<B if there's a route from A to B. It may be noted that the order is partial as it may be possible that according to commutation properties, some operations cannot be in a specific order, i.e., neither A<B nor B<A even if A≠B.

In some exemplary embodiments, the partial order imposed by the commutation-DAG may define the computation-uncomputation pairs selection. The choice of two pairs A→B, C→D for control skipping may be forbidden if A≤C≤B≤D. Such selection may be of super-exponential complexity. However, the problem may be reduced to a constraint optimization problem and be solved using existing solvers, e.g., CSP solvers, theorem provers, or the like, such as based on optimized scores of skipping each possible pair. As an example, denoting by $x_i$ a Boolean variable indicating whether an arc i representing computation-uncomputation pairs having a score $S_i$, which may be the score of either end node (which are of equal scores since they're an operation and its inverse). Then, if two arcs $x_i$, $x_j$ intersect, a constraint¬(not) may be added. The problem may then be maximizing the sum $\Sigma_i S_i x_i$. As another example, the problem may be solved using an integer programming problem with the constraint being $x_i+x_j<2$.

In some exemplary embodiments, the technical solutions described above may depend on the choice of the representation of the circuit in terms of basis unitaries. As both of the solutions rely on repetitions, basis gates may be preferred to enable more possible gates and more possibilities to find computation-uncomputation pairs. However, such solution may not be enough for identifying optimal results. As am example, a given a sequence of operations X . . . Z . . . H where . . . representing application of some multi-qubit gates, may not comprise any computation-uncomputation pairs, and the control of the three single-qubit operations may add three two-qubit operations. However, plugging in qubits according to the following identity Z=HXH, may result in a sequence of X . . . HXH . . . H with the same final results, but with option of two computation-uncomputation pairs to be skipped, resulting in a much more efficient addition of a single two-qubit gate.

Additionally or alternatively, as the technical solutions described above may utilize repetitions, reducing the set of basis gates may be efficient. However, not all possible reductions may be recommended. As an example, X=SX·SX, so X . . . X, in which a single pair is found, may be translated to SX·SX . . . SX·SX, where no computation-uncomputation pairs are found, since SX is of order 4, in comparison to X which has order 2. Accordingly, it may be preferred to reduce the operation representation with gates of similar or lower order, such as Z→HXH or X→HZH, $CZ_{ij}\rightarrow H_jCX_{ij}H_j$ or $CX_{ij}\rightarrow H_jCZ_{ij}H_j$, S→HSXH or SX→HSH (and their inverses, respectively), or the like.

It may be noted that similar transformations may be required to be performed for the inverse gate also, e.g., when a gate is reduced (i.e., S→SX), the inverse gate may also be reduced $S^\dagger\rightarrow SX^\dagger$. Accordingly, it may be desired to reduce the basis gate in size without reducing expressibility, when all removed gates are expressable in terms of remaining gates of equal or lower orders. A partial solution may be provided to this problem that apply to most common basis gate sets. The solution may be configured to focus on reduction using at least one gate of the same order. As an example, the order of any gate may determine its eigenvalues, hence any two gates A,B∈G of the same order n, satisfy $A=U^\dagger BU$ for some unitary. The question may then be translated to whether U can be constructed from: $G_{AB}=\{g\in G-\{A,A^\dagger,B,B^\dagger\}\ \text{order}(g)\leq n\}$. As usually the gates may operate on a small number of qubits it may be possible to calculate U explicitly, thereby reducing the problem to a problem of the expressiveness of a certain gate set, which has been studied extensively. Most commonly, U is a gate of order 2. In such a case, yet may be possible to go over all options in $O(|G|^3)$ computation time.

One technical effect of utilizing the disclosed subject matter is to enable designing efficient quantum algorithms with as few two-qubit gates as possible, by skipping inner controls from controlled quantum circuits, in reduced complexity. The complexity of reducing the number of control gates is polynomial in circuit length complexity (i.e., number of operations in the sequence of operation representing the quantum circuit). Computing the order between nodes may be performed in O(1) in run-time, by precomputing the circuit-DAG and adding an edge A→B if and only A<B (there exists a route from A to B). This calculation may also be polynomial and should be carried before removing edges to conserve order.

Another technical effect of utilizing the disclosed subject matter is to reduce the super-exponentiality of the control skip problem to be solvable in a feasible computation time. In some cases, the disclosed subject matter may provide an approximated solution that may be objectively non-optimal, but may provide a sufficient improvement in the quantum circuit by implementing control skipping.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 110, a quantum circuit may be obtained. The quantum circuit may be a controlled quantum circuit. In some exemplary embodiments, a controlled quantum circuit may be a quantum circuit on which a control is applied, and in which control skips may be implemented. The quantum circuit may be obtained as a representation given in functional-level, in gate-level, or the like. The quantum circuit may be provided in a pre-compiled representation, such as a DAG representation between gates or functional blocks. The quantum circuit may be implementable in several different manners, such as having different operation order that are all in line with the DAG representation.

On Step 120, a sequence of quantum operations may be obtained. In some exemplary embodiments, each operation in the sequence of quantum operations may be a tuple of a gate and an ordered sequence of qubits on which the gate operates. In some exemplary embodiments, the sequence of quantum operations may be operations performed as part of the circuit control of the quantum circuit. The sequence of quantum operations may define a complete order between the quantum operations.

In some exemplary embodiments, the quantum circuit may define a single potential sequence of quantum operations. Additionally, or alternatively, there may be a number of alternative potential sequences that could implement the quantum circuit. For example, a quantum program defining the quantum circuit may define partial order between the operations. The quantum program may be configured to define a set of alternative sequences, such as by providing a partial order, implemented in a DAG. In some exemplary embodiments, in view of commuting quantum operations, different orders may be implemented even if the DAG defines a full order between the operations. In case there are several potential sequences, a sequence may be selected, such as by utilizing a target function to bias the selection, by using brute-force enumeration on all potential alternatives, using a search algorithm searching the alternative sequences space, or the like.

On Step 130, a number of controls of the quantum circuit may be reduced by excluding computation-uncomputation pairs of operations. In some exemplary embodiments, a quantum circuit control may be applied by applying a control on each operation of the quantum circuit, or the sequence of quantum operations representing thereof. The operations may be controlled using quantum-permutative gates such as CNOT, CCNOT, CSWAP, or the like: or using quantum primitives such as Controlled-V, Controlled-$V^\dagger$, or the like. Controlling operations may include replacing gates with larger gates, with more complex and expensive gates, or the like.

In some exemplary embodiments, the number of controls, e.g., the number of operations on which control is applied, may be reduced by excluding computation-uncomputation pairs from control. A computation-uncomputation pair may comprise a pair of operations, X, Y which, when applied, provide the original values (e.g., Z=ZXY). One type of computation-uncomputation pair may be a pair comprising an operation and its inverse operation. As an example, a computation-uncomputation pair may be excluded from control using the following identity $ctrl(V^\dagger UV)=V^\dagger ctrl(U)V$. Another example of computation-uncomputation pair may be a pair of order 2 operations, a pair of Hadamard gates (H), a pair of Pauli-X gates/NOT gates (X), a pair of Pauli-Z gates/phase-flip gates (Z), or the like.

On Step 132, at least two computation-uncomputation pairs of operations separated by a sub-sequence of one or more quantum operations may be identified in the quantum operations. In some exemplary embodiments, the sequence of quantum operations representing the quantum circuit may comprise multiple computation-uncomputation pairs. Additionally or alternatively, in case the sequence of quantum operations representing the quantum circuit comprising only one computation-uncomputation pair of operations, the found pair may be reduced. In case the sequence of quantum operations does not comprise any computation-uncomputation pair of operations, the quantum circuit control may be defined as minimal.

Figure 2:
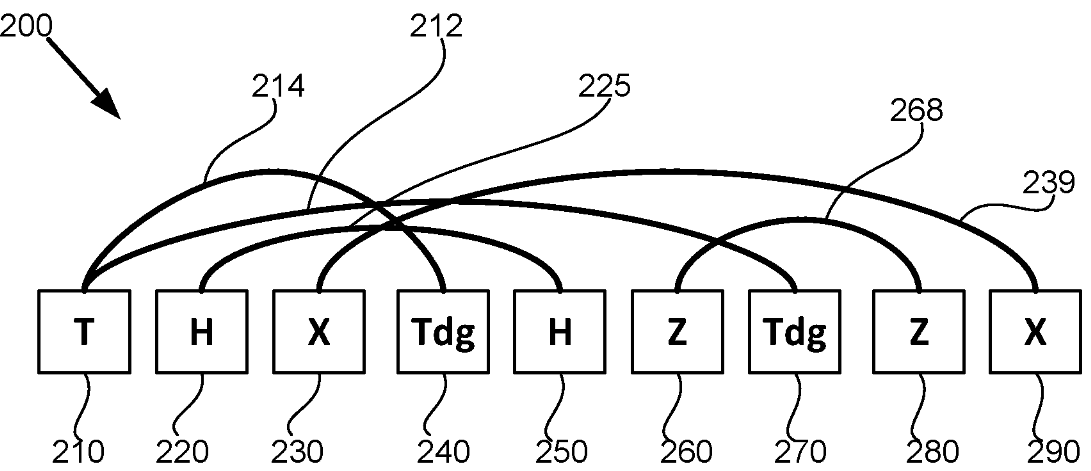
FIG. 2 shows a schematic illustration of an exemplary noncommuting gate sequence with possible computation-uncomputation arcs, in accordance with some exemplary embodiments of the disclosed subject matter.

It may be noted that the two or more computation-uncomputation pairs may or may not intersect, may overlap, may include on the other or the like, as is visually illustrated in FIG. 2.

On Step 134, a selection between reducing the first or the second pair of operations may be performed. In some exemplary embodiments, the selection may be performed based on an optimization of a score of the reduced control sequence in comparison to a score of an alternative reduced control sequence in which the other computation-uncomputation pair of operations is reduced instead. In some exemplary embodiments, the score may be determined based on a score of each operation in a respective quantum circuit control.

On Step 135, a score indicating a maximal utility from skipping operation of the computation-uncomputation pairs may be computed for each pair. In some exemplary embodiments, the score for sequence of quantum operations may be computed based on the maximal utility from skipping a pair of operations and the score of the remainder of the sequence. As an example, consider a sequence of quantum operations that comprises n quantum operations which are denoted as $o_1, o_2, \ldots, o_n$. The score for sequence of quantum operations, denoted as $S_{1,n}$, may be computed based on a summation of score defined for skipping operation $o_i$ in the control sequence, denoted as $S(o_i)$, for each skipped operation $o_i$ in the control sequence, and a score indicating maximal utility from skipping operations in the control sequence defined by a sub-sequence of $o_i, o_{i+1}, \ldots, o_j$, denoted as $S_{i,j}$. In some exemplary embodiments, $S_{i,j}$ may be computed according to the following formula:

$$S_{i,j} = \max\left\{S_{i+1,j,}, S(o_i) + \max_{k\in[i+1,j] \text{ and } o_k=o_i-1} S_{i+1,k-1} + S_{k+1,j,}\right\}$$

In some exemplary embodiments, the score for $S_{i,j}$ may be computed based on two alternative options: (1) avoiding to perform a control skip relating to a specific operation and (2)

performing a control skip relating to the specific operation. Consider the above exemplary formula $S_{i,j}$. Such formula corresponds to left-to-right analysis of the sequence operations. $S_{i,j}$ is computed as the maximal value between two options: avoiding to perform the control skip from the left-most operation in the sequence $o_i \ldots o_j$ (i.e., $o_i$) and performing the control skip using $o_i$. If control skip is avoided with respect to $o_i$ then the score of $S_{i,j}$ is equal to $S_{i+1,j}$, as or will not be used for control skips. However, if the there is a control skip with respect to or then this creates a limitation on additional controls skips that can be performed. The score is then computed based on the score from the score of the skip itself ($S(o_i)$) and in view of additional control skips that can be performed with the remaining sub-sequences. If the control skip of $o_i$ is performed with operation $o_k$, then additional control skips can be performed in between such two operations (i.e., in the sub-sequence of $o_{i+1} \ldots o_k$), or within the operations after the second operation $o_k$, meaning between operations $o_{k+1} \ldots o_j$. It is noted, however, that there may be multiple of alternative pairs in which $o_i$ participates, and each such alternative may be explored. For each k between i+1 and j, that is an inverse of $o_i$ (i.e., $o_k = o_i^{-1}$), the scores of the subsequences are computed, and the k that provides the maximal score is selected.

It is noted that the above formula is an example only. An alternative formula relating to a right-to-left analysis may be, for example:

$$S_{i,j} = \max\left\{S_{i,j-1,}, S(o_j) + \max_{k\in[i,j-1]\ and\ o_k=o_i-1} S_{i,k-1} + S_{k+1,j-1,}\right\}.$$

Other formulas may be utilized to represent a different analysis order of the sequence, such as creating a prefix and suffix for analysis, instead of just suffix (e.g., in case of a left-to-right analysis) or just prefix (e.g., in case of a right-to-left analysis. The disclosed subject matter is not limited to any specific analysis order or score computation formula.

In some exemplary embodiments, the $S(o_i)$ score may be different for different quantum operations. The $S(o_i)$ score may be defined based on a reduction in quantum resources when skipping operation $o_i$ from the control of the quantum circuit.

On Step 136, the selected computation-uncomputation pair may be excluded from the quantum circuit control without excluding the other computation-uncomputation pair of operations from the quantum circuit control, thereby obtaining a reduced control sequence.

Step 130 may include repetitive selection and reductions of pairs in the control sequence, to implement multiple control skips. In some exemplary embodiments, the repetitive selection may be implemented using a recursion, using a loop instruction, or the like.

On Step 140, a quantum circuit with the reduced number of controls of the quantum circuit may be outputted.

On Step 190, the quantum circuit may be executed on a quantum execution platform, such as a quantum computer, a quantum computer simulator, or the like. In some exemplary embodiments, the quantum circuit may be compiled to create an executable circuit that is suitable for execution on the target quantum execution platform.

Figure 1B:
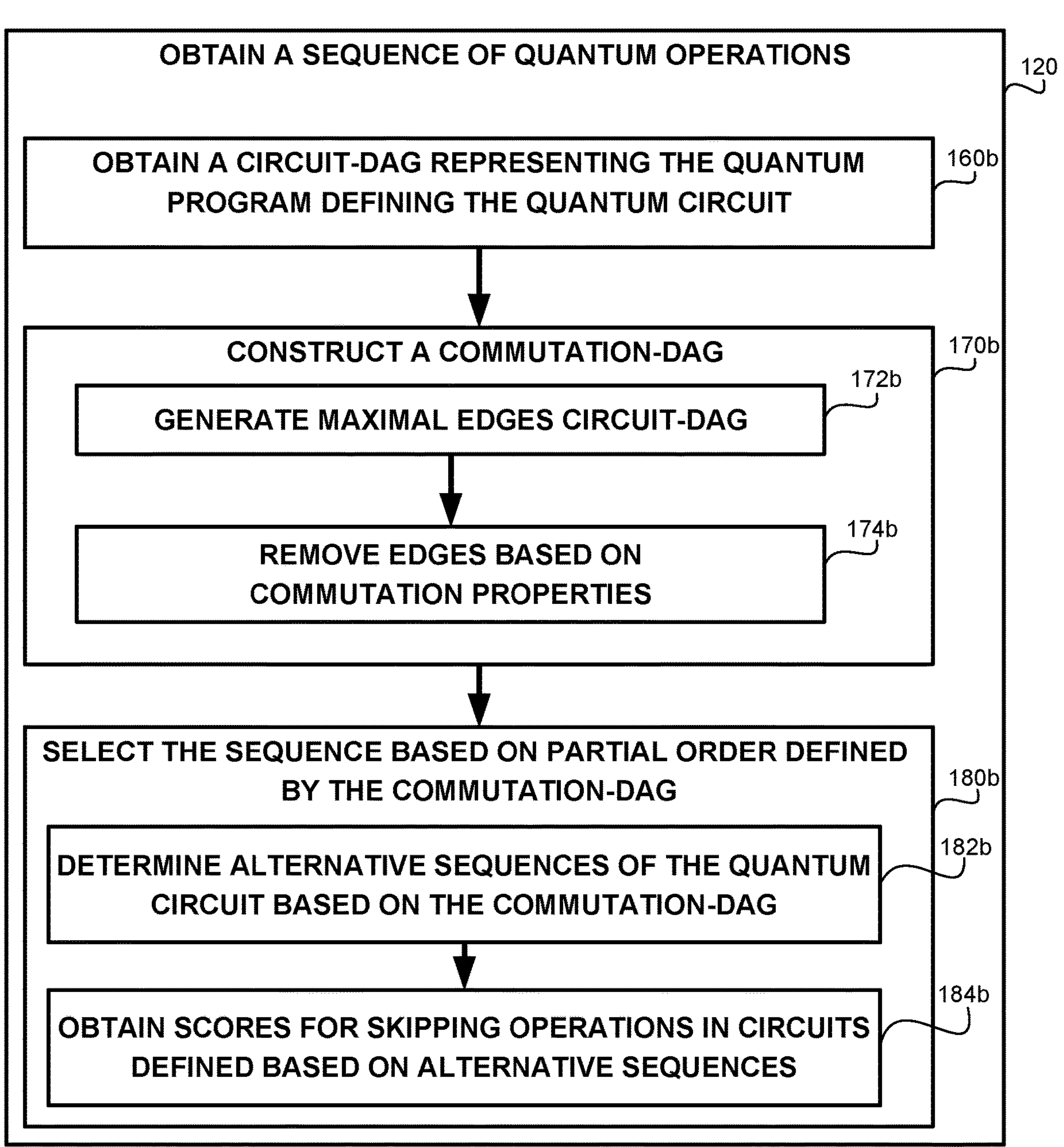

Referring now to FIG. 1B showing a flowchart diagram of a method, in accordance with some exemplary embodiments of the disclosed subject matter.

In some exemplary embodiments, FIG. 1B shows an optional method for obtaining the sequence of quantum operations (Step 120). Additionally or alternatively, the sequence of quantum operations representing the quantum circuit may be selected or obtained in other methods. In some cases, the implementation of Step 120 of FIG. 1B, also includes Step 130, or portion thereof, during which scores are computed for a sequence based on optimal control skips that are valid for such sequence.

Figure 3A:
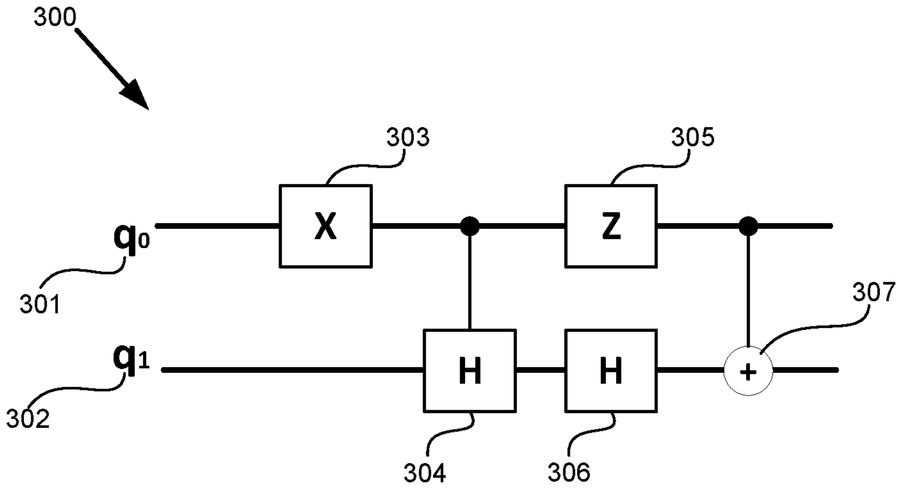
FIG. 3A shows a schematic illustration of an exemplary quantum circuit, in accordance with some exemplary embodiments of the disclosed subject matter.
Figure 3B:
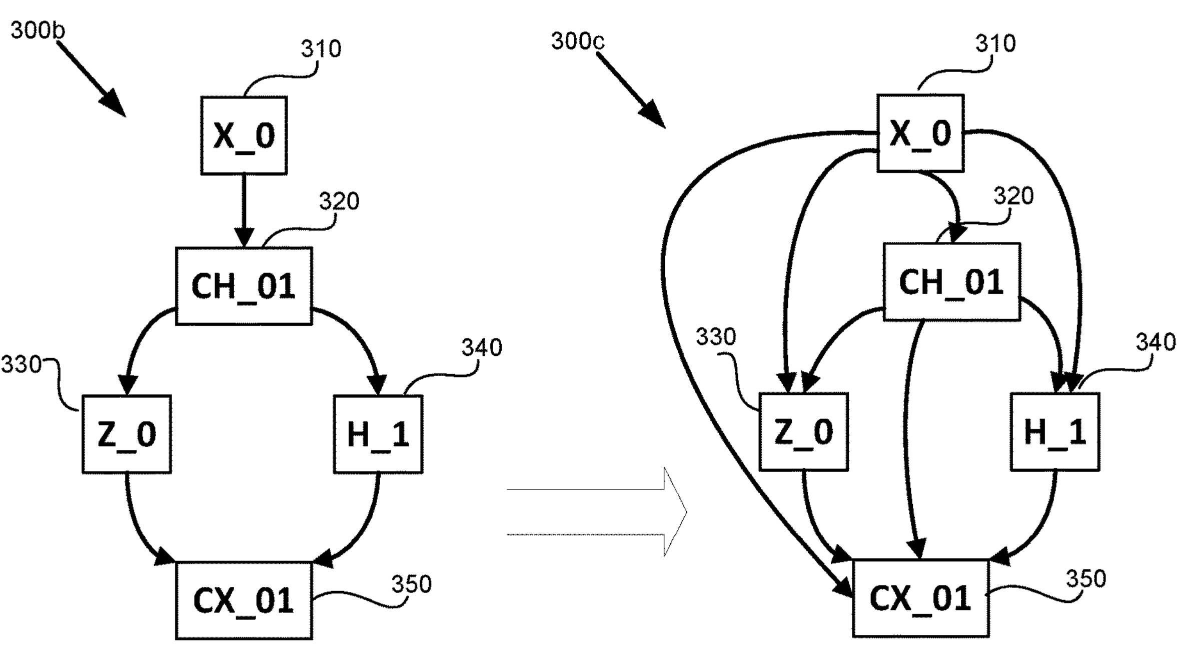
FIG. 3B shows a schematic illustration of exemplary Directed Acyclic Graphs (DAGs) associated with a quantum circuit, in accordance with some exemplary embodiments of the disclosed subject matter.
Figure 3B:
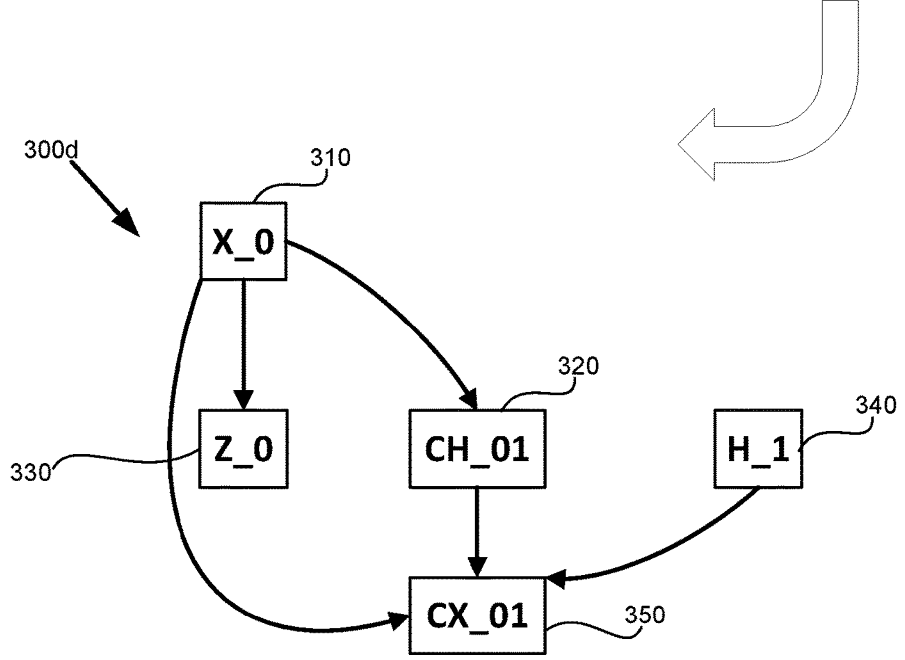

On Step 160*b*, a circuit-DAG representing the quantum program defining the quantum circuit may be obtained (such as 300*b* of FIG. 3B). In some exemplary embodiments, each node in the circuit-DAG may be configured to represent a quantum operation. Each directed edge in the circuit-DAG from a first node to a second node may be configured to represent that the operation represented by the second node immediately follows the operation represented by the first node in the quantum circuit.

On Step 170*b*, a commutation-DAG of the quantum circuit (such as 300*d* of FIG. 3B) may be constructed based on the circuit-DAG. In some exemplary embodiments, the commutation-DAG may represent partial order between quantum operations of the quantum circuit in view of commutation property of quantum operations pairs.

On Step 172*b*, a maximal edges circuit-DAG (e.g., 300*c* of FIG. 3B) may be generated based on the circuit-DAG. In some exemplary embodiments, the maximal edges circuit-DAG may be a closure of the circuit-DAG, adding a directed edge between two operations that have a path in between them in the circuit-DAG.

On Step 174*b*, edges may be removed from the maximal edges circuit-DAG based on commutation property of operations of nodes connected by the edges.

On Step 180*b*, a sequence of the quantum operations may be selected based on the partial order defined by the commutation-DAG.

On Step 182*b*, alternative sequences of the quantum circuit may be determined based on the commutation-DAG.

On Step 184*b*, scores of potential control skip operations for each alternative sequence may be computed. In some cases, each alternative sequence may be analyzed to determine potential for control skip operations and utility score therefrom. The analysis may include similar analysis to that described with respect to Step 135 of FIG. 1A.

In some exemplary embodiments, this problem is super-exponential and accordingly, processing power required to solve it may be large and this may not be feasible. In some cases, the problem but may be reduced to a constraint optimization problem (CSP) and be solved using CSP solvers. In some exemplary embodiments, all possible arcs may be created polynomially, (e.g., going over all node pairs is quadratic in the number of nodes). Denote by x a Boolean variable indicating i whether we take arc i and by $S_i$ its score, which is the score of either end node (which are of i equal scores since they're an operation and its inverse). Then, if two arcs $x_i$, $x_j$ intersect, a constraint $\neg(x_i \hat{} x_j)$. The CSP solver may attempt to maximize $\Sigma_i S_i x_i$. Additionally or alternatively, the constraint may be defined as $x_i + x_j < 2$, making it an integer programming problem.

Figure 1C:
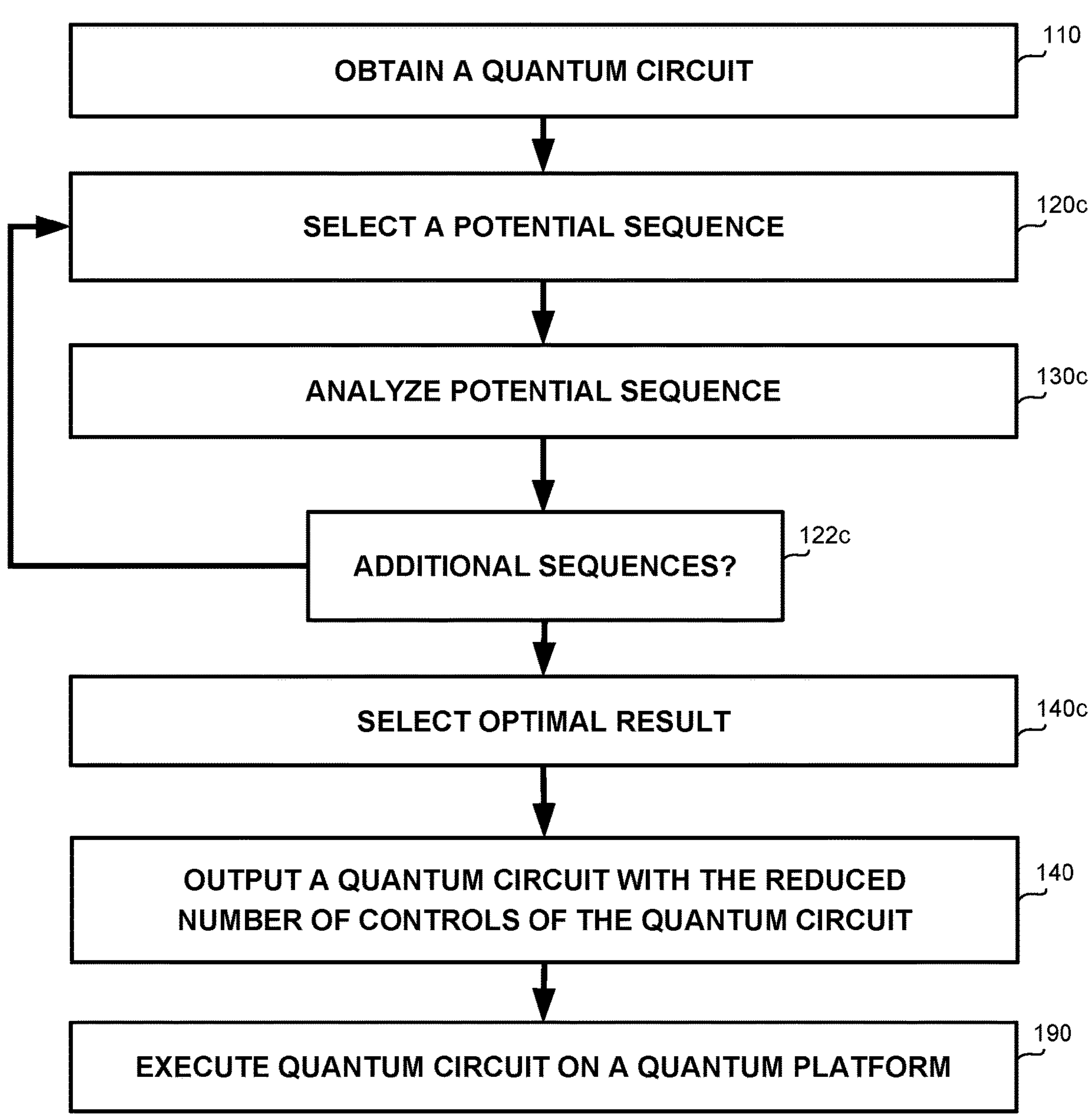

Referring now to FIG. 1C showing a flowchart diagram of a method, in accordance with some exemplary embodiments of the disclosed subject matter.

After a quantum circuit is obtained (110), a potential sequence is selected (120*c*), the potential sequence is then analyzed to compute a score (130*c*). The score may be indicative of a utility from potential control skips given the order defined in the sequence. If additional sequences exist which were not yet examined (122$c$), the process may analyze them accordingly. An optimal result is selected based on the scores (140$c$) and is used for outputting and execution (140, 190).

In some exemplary embodiments, instead of an analysis all potential sequences, improved methods may be utilized to conduct a search of the potential sequences space to identify an optimal sequence. In some exemplary embodiments, a CSP may be defined to enable a CSP solver to implement efficient exploration of the potential sequences space, while attempting to maximize a target function—the score. In some exemplary embodiments, other solvers, such as but not limited to integer programming problem solver, theorem solver, or the like, may be utilized instead of or in addition to the CSP solver in order to implement an efficient exploration of the sequences space, while attempting to maximize the score.

Figure 1D:
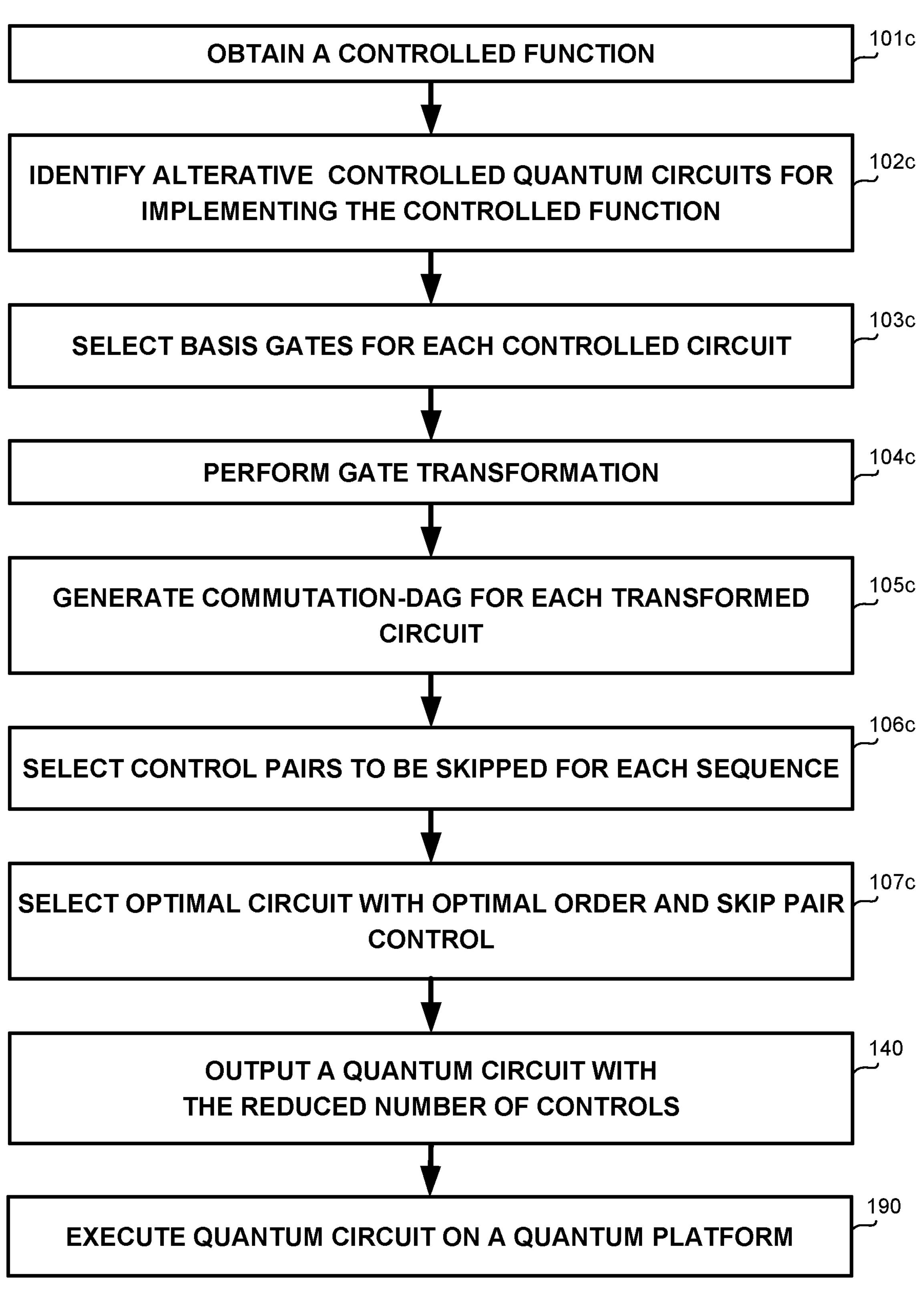

Referring now to FIG. 1D showing a flowchart diagram of a method, in accordance with some exemplary embodiments of the disclosed subject matter.

On Step 101$c$, a controlled function to be synthesized using quantum circuits may be obtained. In some exemplary embodiments, the controlled function ctrl(F) may be obtained by controlling an original function F. In some exemplary embodiments, function F may be possible to be implemented using several quantum circuits $C_1, C_2, \ldots, C_m$. The controlled function ctrl(F) may be implemented by controlling each of the possible quantum circuits ctrl($C_1$), ctrl($C_2$), . . . , ctrl($C_m$). It may be noted that while the several circuits may have the same functionality, they may not be equally suitable or effective for the technical solution of skipping controls. As an example, it may be possible that $C_1$ is preferable compared to $C_2$ for implementing function F, but ctrl($C_1$) is preferable than ctrl($C_2$) for implementing the controlled function ctrl(F).

On Step 102$c$, alternative quantum circuits ctrl($C_1$), ctrl ($C_2$), . . . , ctrl($C_m$) may be determined for the controlled function ctrl(F). Several models or techniques may be utilized to determine the alternative circuits, such as in a similar manner to that described in U.S. patent application Ser. No. 17/149,326 filed Feb. 19, 2021, entitled "Quantum Circuit Modeling", which is hereby incorporated by reference in its entirety for all purposes without giving rise to disavowment.

On Step 103$c$, basis gates for optimizing skipping pairs may be selected. In some exemplary embodiments, the basis gates may be selected by determining eigenvalues that enable optimal computation-uncomputation pairs. In some exemplary embodiments, it may be preferred to reduce the operation representation with gates of similar or lower order, such as $Z \rightarrow HXH$ or $X \rightarrow HZH$, $CZ_{ij} \rightarrow H_j CX_{ij} H_j$ or $CX_{ij} \rightarrow H_j CZ_{ij} H_j$, $S \rightarrow HSXH$ or $SX \rightarrow HSH$ (and their inverses, respectively), or the like. Additionally or alternatively, it may be preferred to reduce the gate basis gate in size without reducing expressibility, when all removed gates are expressable in terms of remaining gates of equal or lower orders.

On Step 104$c$, gate transformation may be performed based on the selected basis gates and quantum operations identities. It may be noted that similar transformations may be required to be performed for the inverse gate also.

In some exemplary embodiments, Steps 103$c$ and 104$c$ may be performed separately for each alternative circuit modeled for the obtained function, may be performed for each sequence defining a predetermined order of operations of the each alternative sequence, or the like.

On Step 105$c$, a commutation-DAG may be generated for each transformed circuit. Step 105$c$ may performed in accordance with the method diagramed in FIG. 1B.

On Step 106$c$, control pairs to be skipped may be selected. In some exemplary embodiments, Step 106$c$ may performed in accordance with the method diagramed in FIG. 1A, such as when the circuit have a complete order between the operations, or when neglecting commutation properties. Additionally or alternatively, Step 106$c$ may performed in accordance with the method diagramed in FIG. 1A for each sequence if operations defined by the commutation-DAG, separately. Additionally or alternatively, Step 106$c$ may performed in accordance with the method diagramed in FIG. 1B, for each commutation-DAG, such as using CSP solvers, integer programming problems solvers, theorem provers, or the like.

On Step 107$c$, an ordered sequence of operations representing the transformed controlled quantum circuit, which provides the optimal control skip selection, may be selected.

Referring now to FIG. 2 showing a schematic illustration of an exemplary noncommuting gate sequence with possible computation-uncomputation arcs, in accordance with some exemplary embodiments of the disclosed subject matter.

In some exemplary embodiments, when neglecting commutation between quantum operations, a quantum circuit or a portion thereof, on which a quantum control is applied may be represented using a sequence of quantum operations. Each operation may be represented as a tuple of a gate and a sequence of qubits on which the gate operates. The sequence of quantum operation in such cases, may define a complete order between the quantum operations.

As an example, Sequence 200 may comprise nine quantum operations denoted as $o_1, o_2, \ldots, o_9$. For simplicity, each operation in Sequence 200 is represented as a gate operated on a single qubit. As an example, operation $o_1$ is represented using Gate 210, which is also referred to as Operation 210. However, the sequence or similar sequences may comprise other types of operations of quantum gates, operating on varying numbers of qubits.

In some exemplary embodiments, the number of controls of the quantum circuit may be reduced by excluding computation-uncomputation pairs of operations from the quantum circuit control to obtain a reduced control sequence. The reduced control sequence may comprise three subsequences, at most, before the first operation of computation-uncomputation pair, between computation-uncomputation pair, and after the second operation of the computation-uncomputation pair.

In some exemplary embodiments, a geometrical interpretation of the controlled circuit problem may be performed based on Sequence 200. Each pair control, e.g., a possible pair of operations that can be control skipped, such as a computation-uncomputation pair, may be represented using an arc. The inverse of an operation may be the inverse of its gate on identical qubits, $(x, 1)^{-1}=(x^{-1}, 1)=(x, 1)$. As an example, Arcs 212 and 214 may represent the pairing of Operation 210 represented by gate T with Operation 270 and with Operation 240, respectively. As each of Operation 240 and with Operation 270 is represented by the gate $T^\dagger$ (also referred to as Tdg) which is the inverse of the gate T on identical qubits. As another example, Arc 225 may represent the pairing of Operation 220 with Operation 250, As the Hadamard gate H is involutory. Similarly, Arc 239 and Arc 268 may represent pairing of Operations 230, 290 and Operations 260, 280 representing Pauli-X gates. Thus, by selecting a certain control pair to be skipped, e.g., selecting a certain arc in the geometrical interpretation of the controlled circuit problem, the problem may be separated into two smaller problems: below and above the arc, e.g., the subsequence between the first and second gates of the skipped pair control, and the two or less subsequences before the first gate and after the second gate of the of skipped pair control. Each part may thus contain a smaller list of operations.

It may be noted that a pair control may be skipped only if the arch representing thereof not cross any arc representing a pair control already being skipped. Accordingly, an optimized selection of pair controls to be skipped may be required.

In some exemplary embodiments, reducing the number of controls may comprises selecting between reducing a first computation-uncomputation pair and between reducing a second computation-uncomputation pair based on an optimization of a score of the reduced control sequence in comparison to a score of an alternative reduced control sequence in which the second computation-uncomputation pair of operations is reduced and the first computation-uncomputation pair of operations is not reduced. The score may be determined based on a score of each operation in a respective quantum circuit control.

In some exemplary embodiments, each operation ($o_1$) may be assigned with a score $S(o_i)$ indicating the utility from skipping the operation in Sequence 200. Score $S(o_i)$ may be different for different quantum operations, and may be defined based on a reduction in quantum resources when skipping operation $o_1$ from the control of the quantum circuit represented by Sequence 200.

In some exemplary embodiments, when the pair controls do not intersect, both of the pair controls may be skipped. However, in some cases when the pairs intersect, an optimized pair reduction may be selected. In some exemplary embodiments, the intersected computation-uncomputation pairs may share an operation, such as Arc 214 and Arc 217. In such case, due to exclusion of on computation-uncomputation pair (e.g., Operation 210 and Operation 240), the second computation-uncomputation pair (e.g., Operation 210 and Operation 290) cannot be excluded. As in case of intersected arcs, such as Arc 214 and Arc 225, Operation 240 is under Arc 225, and Operation 220 is under Arc 214. Accordingly, due to exclusion of the computation-uncomputation pair of Operation 210 and Operation 240 (i.e., selection of Arc 214), the second computation-uncomputation pair of Operation 220 and Operation 250 (i.e., selection of Arc 225), cannot be excluded. On the other hand, when the arcs do not intersect, both pairs may be skipped. As an example, both Arc 225 which represents skipping of computation-uncomputation pair of Operation 220 and Operation 250, and Arc 268 which represents skipping of computation-uncomputation pair of Operation 260 and Operation 280 may be selected.

In some exemplary embodiments, for each choice of a pair to be skipped (e.g., an arc), a score $S_{i,j}$ may be computed. The score may be configured to indicate the maximal utility from skipping the pair operations in the control sequence. The maximal utility score, $S_{i,j}$, or a subsequence $o_i, o_{i+1}, \ldots, o_j$ may be computed according to one of the following:

$$S_{i,j} = \max\left\{S_{i+1,j,}, S(o_i) + \max_{k\in[i+1,j] \text{ and } o_k=o_i-1} S_{i+1,k-1} + S_{k+1,j,}\right\}.$$

$S_{k+1,j}$, may represent the maximal score for the subsequence "outside the arc", e.g., to the right of the selected pair [k+1, j]. $S_{i+1,k-1}$ may represent the maximal score for the subsequence contained within the pair, e.g., between i+1 and k−1; $S(o_i)$ indicates the utility score from skipping the operation i, and k is selected to be the optimal operation to be skipped with operation i. The number of max-computations may be limited by the number of ranges which is $O(n^2)$, providing a solution polynomial in circuit length when neglecting commutation.

Referring now to FIG. 3A showing a schematic illustration of an exemplary quantum circuit, in accordance with some exemplary embodiments of the disclosed subject matter.

In some exemplary embodiments, the polynomial solution represented in FIG. 2, may not apply for quantum circuits, as it may assume non-commutativity of the sequence of operations, e.g., it may neglect possible reorderings of the operations. As an example, Circuit 300 represented in FIG. 3A, comprises multiple operations on Qubits 301-302 ($q_0$ and $q_1$), such as Gate 303 (X) operating on Qubit 301 ($q_0$), Gate 304 (H) operating on the result of Gate 303 (X) on Qubit 301 ($q_0$) and Qubit 302 ($q_1$), or the like. Circuit 300 cannot be represented using a single sequence of operations, as the multiple orders of applying the operations may be valid, due to commutation relations between operations. An optimized sequence for Circuit 300 that may prevent "arc intersection" and allow more choices for computation-uncomputation pair skips may be selected.

Referring now to FIG. 3B showing a schematic illustration of exemplary DAGs associated with the quantum circuit represented in FIG. 3A, in accordance with some exemplary embodiments of the disclosed subject matter.

In some exemplary embodiments, circuit-DAGs may be graphs used to analyze quantum circuits. A circuit-DAG may be a directed graph with no directed cycles, consisting of nodes (also referred to as vertices) representing operations in a quantum circuit and edges representing an order between the operations. As an example, Circuit DAG 300*b* may be an analysis representation of Circuit 300. Each node in circuit-DAG 300*b* represents an operation in Circuit 300. As an example. Node 310 represents the operation of Gate 303 (X) on Qubit 301 ($q_0$). A directed edge in Circuit 300 connects between a first node and the second node if the operation represented by the second node must follow the operation represented by the second node. As an example, the edge connecting between Node 310 and Node 320 may represent that the operation of Gate 304 must follow the operation of Gate 303 (X) on Qubit 301 ($q_0$), as it is applied on the result thereof.

In some exemplary embodiments, Maximal Edges circuit-DAG 300*c* may be a graph imposing a maximal order on operations represented by Circuit 300*a*. Maximal Edges circuit-DAG 300*c* may be generated based on Circuit DAG 300*b*, by adding all possible transitive directed edges between its nodes. Maximal Edges circuit-DAG 300*c* may be an analysis representation for determining commutative properties of operations of Circuit 300.

In some exemplary embodiments, Commutation-DAG 300*d* may be a graph imposing partial orders between operations represented by Circuit 300*a*. Commutation-DAG 300*d* may be generated based on Maximal Edges circuit-DAG 300*c* by removing edges connecting between commuting operators. Commutation-DAG 300*d* may be configured impose a partial order on the operations represented by its nodes, where A<B if there's a route from the node representing operation A to the node representing operation B. It may be noted that the order may be partial, e.g., it may be possible that neither A<B nor B<A even if A≠B.

It may be noted that Commutation-DAG 300*d* may be efficiently generated in a polynomial run-time complexity in the circuit size (e.g., number of gates), by precomputing circuit-DAG 300*b* and adding an edge between a node representing operation A to a node representing operation B if and only if A<B (there exists a route from A to B in Maximal Edges circuit-DAG 300*c*). This calculation may also be polynomial and should be carried before removing edges to conserve order. Utilizing Commutation-DAG 300*d* may reduce the super-exponentiality of the control skip problem to a constraint optimization problem and be solved using existing CSPs. Maximal Edges circuit-DAG 300*c* may be created in a polynomial complexity (adding all possible edges may be performed by going over all node pairs in Circuit-DAG 300*b*, which may be is quadratic in the number of nodes.

In some exemplary embodiments, Commutation-DAG 300*d* may be utilized to determine control skipping. The choice of two edges A→B, C→D for control skipping, may be forbidden if A≤C≤B≤D. A decision whether to select a computation-uncomputation pair may be performed based on score optimization similar to pair selection based on selection of scored arcs in Commutation-DAG 300*d*. The choice may be exemplified by denoting by $x_i$ a Boolean variable indicating whether to skip arc i and by $S_i$ a score of skipping arc i, which may be the score of either end node (which may be of equal scores since the pair comprises an operation and its inverse). A constraint $\neg(X_i \hat{} X_j)$ may be added for two arcs $x_i$, $x_j$ that intersect. The decision of which pairs to skip may be taken by maximizing the sum of skipping score $\Sigma_i S_i x_i$. Additionally or alternatively, the problem may be reduced to an integer program problem solving the constraint $x_i+x_j<2$.

Figure 4:
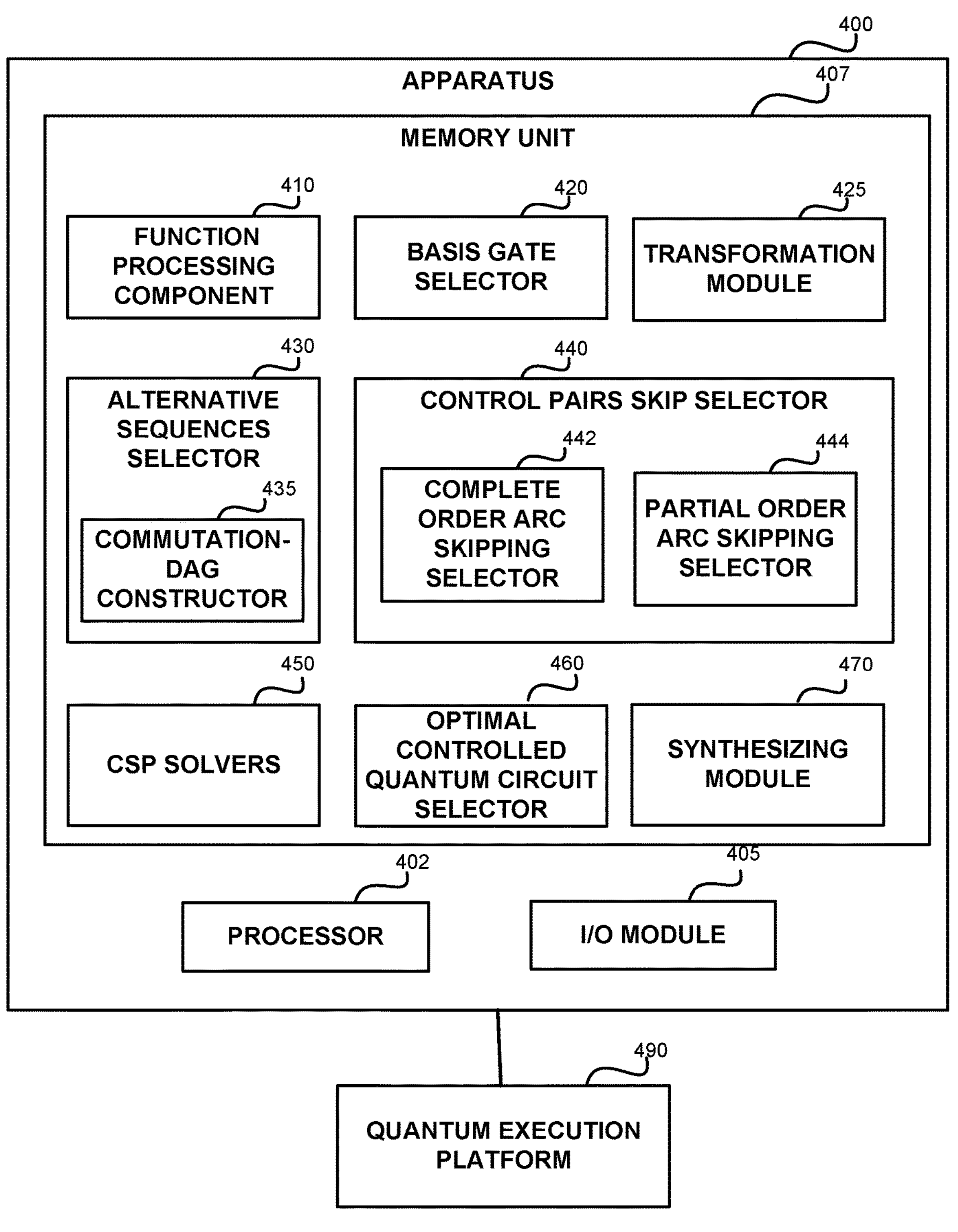
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter. An Apparatus 400 may be configured to support parallel user interaction with a real-world physical system and a digital representation thereof, in accordance with the disclosed subject matter.

In some exemplary embodiments, Apparatus 400 may comprise one or more Processor(s) 402. Processor 402 may be a Central Processing Unit (CPU), a microprocessor, an electronic circuit, an Integrated Circuit (IC) or the like. Processor 102 may be utilized to perform computations required by Apparatus 400 or any of it subcomponents. It is noted that Processor 402 may be a traditional processor, and not necessarily, a quantum processor.

In some exemplary embodiments of the disclosed subject matter, Apparatus 200 may comprise an Input/Output (I/O) module 405. I/O Module 405 may be utilized to provide an output to and receive input from a user, such as, for example obtaining functions, outputting reduced controlled quantum circuits, obtain a user-defined quantum program, compilation instructions, optimization instructions, selection of an optimization criteria, provide output to the user, provide visualization of the quantum program, showing a DAG representing the quantum circuit, showing circuit illustrations, or the like.

In some exemplary embodiments, Apparatus 400 may comprise Memory 407. Memory 407 may be a hard disk drive, a Flash disk, a Random-Access Memory (RAM), a memory chip, or the like. In some exemplary embodiments, Memory 407 may retain program code operative to cause Processor 402 to perform acts associated with any of the subcomponents of Apparatus 400. Memory 407 may comprise one or more components as detailed below, implemented as executables, libraries, static libraries, functions, or any other executable components.

In some exemplary embodiments, Function Processing Component 410 may be configured to process functions, controlled functions, to determine alternative quantum circuit for implementing a function or a controlled function. Function Processing Component 410 may be configured to process functions in accordance with the disclosed subject matter. It is noted that many different models for selecting circuits for implementing functions or functional components may be utilized, and the disclosed subject matter is not necessarily limited to any one implementation. As an example, Function Processing Component 410 may utilize CSP models, in a similar manner to that described in U.S. patent application Ser. No. 17/149,326 filed Feb. 19, 2021, entitled "Quantum Circuit Modeling", which is hereby incorporated by reference in its entirety for all purposes without giving rise to disavowment. Additionally, or alternatively, the different alternative controlled circuits for implementing a given controlled option may be selected in a similar manner to that described in U.S. Pat. No. 11,373,114 B1 filed Oct. 12, 2021, entitled "CSP-BASED SYNTHESIS OF A QUANTUM CIRCUIT", or in U.S. patent application Ser. No. 17/450,584 filed Oct. 12, 2021, entitled "A Functional-Level Processing Component for Quantum Computers", or in U.S. patent application Ser. No. 17/499,082 filed Oct. 12, 2021, entitled "Dynamic Synthesis Of Gate-Level Implementations Of Functional Blocks In Quantum Circuits", which are hereby incorporated by reference in their entirety for all purposes without giving rise to disavowment.

In some exemplary embodiments, Basis Gate Selector 420 may be configured to may be configured to select a basis gate to be utilized in implementing a controlled function using quantum circuits. In some exemplary embodiments, Basis Gate Selector 420 may be configured to reduce the set of basis gates in a manner enabling finding more possible computation-uncomputation pairs, thereby reducing the operation representation with gates of similar or lower order. Additionally or alternatively, Basis Gate Selector 420 may be configured to reduce the basis gate in size without reducing expressibility, when all removed gates are expressable in terms of remaining gates of equal or lower orders. Additionally or alternatively, Basis Gate Selector 420 may be configured to focus on reduction using at least one gate of the same order. It is noted that many different models for basis gate selection may be utilized by Basis Gate Selector 420, such as and not limited implementations described in U.S. patent application Ser. No. 17/450,583 filed Oct. 12, 2021, entitled "Provisioning Functional-Level Information to Be Utilized in Gate-Level Processing of Quantum Circuits", which is hereby incorporated by reference in its entirety for all purposes without giving rise to disavowment.

In some exemplary embodiments, Transformation Module 425 may be configured to perform the relevant transformation of gates and operations in accordance with the selections of Basis Gate Selector 420. Transformation Module 425 may be configured to perform the relevant transformation both for the relevant gates and the inverse gates thereof.

In some exemplary embodiments, Alternative Sequences Selector 430 may be configured to determine different alternative sequences representing each quantum circuit, defining different orders between the operations. In some exemplary embodiments, Alternative Sequences Selector 430 may be configured to utilize a Commutation-DAG Constructor 435, to generate a commutation-DAG for each alternative quantum circuit that imposes a partial order on the operations. Commutation-DAG Constructor 435 may be configured to construct the commutation-DAG based on a circuit-DAG representing the circuit, and in accordance with commutations properties of the operations. The circuit-DAG may be generated using alternative different algorithms such as in a similar manner to that described in U.S. patent application Ser. No. 17/149,326 filed Feb. 19, 2021, entitled "Quantum Circuit Modeling", which is hereby incorporated by reference in its entirety for all purposes without giving rise to disavowment. In some exemplary embodiments, Alternative Sequences Selector 430 may be configured to removing edges between commuting operations in maximal edges circuit-DAGs.

In some exemplary embodiments, Control Pairs Skip Selector 440 may be configured to select pairs of computation-uncomputation operations from a representation of the controlled quantum circuit to be skipped, in a manner providing an optimal quantum circuit with minimal number of controlled operations.

In some exemplary embodiments, Control Pairs Skip Selector 440 may be configured to utilize a Complete Order Arc Skipping Selector 442. Complete Order Arc Skipping Selector 442 may be configured to select pairs of computation-uncomputation operations to be skipped in a sequence of operations defining a complete order between the operations. In some exemplary embodiments, Complete Order Arc Skipping Selector 442 may be configured to reduce a number of controls of the quantum circuit represented by a given sequence by excluding computation-uncomputation pairs of operations from the quantum circuit control based on an optimization of a score of the reduced control sequence in comparison to a score of an alternative reduced control sequence in which other combination of computation-uncomputation pairs of operations is reduced.

Additionally or alternatively, Control Pairs Skip Selector 440 may be configured to utilize a Partial Order Arc Skipping Selector 444. Partial Order Arc Skipping Selector 444 may be configured to select pairs of computation-uncomputation operations to be skipped in a commutation-DAG defining a partial order between the operations. Control Pairs Skip Selector 440 may be configured to utilize CSP solvers 450 to solve the arc selection according to constraint optimization problem.

In some exemplary embodiments, Optimal Reduced Controlled Quantum Circuit Selector 460 may be configured to provide an optimized quantum circuit for modeling a controlled function, based on the optimal control skips identified by Control Pairs Skip Selector 440.

In some exemplary embodiments, Synthesizing Module 470 may be configured to synthesize quantum circuits according to an optimal control skip determined by Control Pairs Skip Selector 440 and Optimal Reduced Controlled Quantum Circuit Selector 460. In some exemplary embodiments, Synthesizing Module 450 may be configured to execute quantum circuits onto Quantum Execution Platform 490, or any other execution platform, to be executed thereby. In some exemplary embodiments, Synthesizing Module 470 may simulate execution of the quantum circuit using an emulator, a simulator, or the like, on a classic computer, instead of actual execution by Quantum Execution Platform 490.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

obtaining a sequence of quantum operations, each operation is a tuple of a gate and an ordered sequence of qubits on which the gate operates, the sequence of quantum operations defines a complete order between the quantum operations, the quantum operations comprise at least two computation-uncomputation pairs of operations separated by a sub-sequence of one or more quantum operations, the sequence of quantum operations is part of a quantum circuit control of a quantum circuit;

reducing a number of controls of the quantum circuit by excluding a first computation-uncomputation pair of operations from the quantum circuit control and without excluding a second computation-uncomputation pair of operations from the quantum circuit control, whereby obtaining a reduced control sequence, wherein said reducing the number of controls comprises selecting between reducing the first computation-uncomputation pair and between reducing the second computation-uncomputation pair based on an optimization of a score of the reduced control sequence in comparison to a score of an alternative reduced control sequence in which the second computation-uncomputation pair of operations is reduced and the first computation-uncomputation pair of operations is not reduced, wherein the score is determined based on a score of each operation in a respective quantum circuit control; and outputting a quantum circuit with the reduced number of controls of the quantum circuit.

2. The method of claim 1, wherein the first computation-uncomputation pair and the second computation-uncomputation pair intersect.

3. The method of claim 2, wherein the first computation-uncomputation pair comprises a first operation and a second operation, the second operation is an inverse operation to the first operation, wherein the second computation-uncomputation pair comprises the first operation and a third operation, the third operation is an inverse operation to the first operation, wherein the sub-sequence of the first computation-uncomputation pair includes the third operation or the sub-sequence of the second computation-uncomputation pair includes the second operation, whereby due to exclusion of the first computation-uncomputation pair, the second computation-uncomputation pair cannot be excluded.

4. The method of claim 2, wherein the first computation-uncomputation pair comprises a first operation and a second operation, the second operation is an inverse operation to the first operation, wherein the second computation-uncomputation pair comprises a third operation and a fourth operation, the fourth operation is an inverse operation to the third operation, wherein the sub-sequence of the first computation-uncomputation pair includes the third operation or the fourth operation, wherein the sub-sequence of the second computation-uncomputation pair includes the first operation or the second operation.

5. The method of claim 1, wherein the sequence of quantum operations comprises n quantum operations denoted as $o_1, o_2, \ldots, o_n$, wherein said reducing comprises computing $S_{1,n}$, wherein $S_{i,j}$ is a score indicating maximal utility from skipping operations in the control sequence defined by a sub-sequence of $o_i, o_{i+1}, \ldots, o_j$, wherein $S_{1,n}$ is computed based on a summation of $S(o_l)$ for each skipped operation or in the control sequence, wherein $S(o_l)$ is a score defined for skipping the operation $o_l$ in the control sequence.

6. The method of claim 5, wherein $S_{i,j}$ is computed according to one of the following:

$$S_{i,j} = \max\left\{S_{i+1,j,}, S(o_i) + \max_{k\in[i+1,j]\ and\ o_k=o_i-1} S_{i+1,k-1} + S_{k+1,j,}\right\},$$

$$S_{i,j} = \max\left\{S_{i,j-1,}, S(o_j) + \max_{k\in[i,j-1]\ and\ o_k=o_i-1} S_{i,k-1} + S_{k,j-1,}\right\}.$$

7. The method of claim 5, wherein the $S(o_l)$ score is different for different quantum operations that is defined based on a reduction in quantum resources when skipping operation $o_l$ from the control of the quantum circuit.

8. The method of claim 1, wherein said obtaining the sequence of quantum operations comprises: selecting the sequence of quantum operations based on partial order defined by a quantum program defining the quantum circuit, wherein the quantum program defines a set of alternative sequences in view of commuting quantum operations.

9. The method of claim 8, wherein said selecting comprises:

obtaining a circuit Directed Acyclic Graph (DAG) based on the quantum program, wherein each node in the circuit-DAG represents a quantum operation, each directed edge in the circuit-DAG from a first node to a second node represents that the operation represented by the second node immediately follows the operation represented by the first node in the quantum circuit;

constructing, based on the circuit-DAG, a commutation-DAG of the quantum circuit, the commutation-DAG represents partial order between quantum operations of the quantum circuit in view of commutation property of quantum operations pairs;

selecting a sequence of the quantum operations based on the partial order defined by the commutation-DAG.

10. The method of claim 9, wherein said selecting is performed using a solver that is configured to solve a selection problem from potential alternative sequences defined by the commutation-DAG, wherein the solver is configured to select the sequence so as to optimize a target function that is based on a score of the selected sequence, the score of the selected sequence is defined based on a score of the potential alternative sequences, the score is determined based on a score of each operation skipped in a respective quantum circuit control in a circuit that is defined based on the potential alternative sequences.

11. The method of claim 10, wherein the solver is at least one of a Constraint Satisfaction Problem (CSP) solver and an integer programming problem solver.

12. The method of claim 9, wherein said constructing comprises generating a maximal edges circuit-DAG based on the circuit-DAG, the maximal edges circuit-DAG is a closure of the circuit-DAG, wherein the commutation-DAG is constructed by removing edges from the maximal edges circuit-DAG based on commutation property of operations of nodes connected by the edges.

13. The method of claim 1 further comprises reducing a set of basis gates in the sequence.

14. A computerized apparatus having a processor, the processor being adapted to perform the steps of:

obtaining a sequence of quantum operations, each operation is a tuple of a gate and an ordered sequence of qubits on which the gate operates, the sequence of quantum operations defines a complete order between the quantum operations, the quantum operations comprise at least two computation-uncomputation pairs of operations separated by a sub-sequence of one or more quantum operations, the sequence of quantum operations is part of a quantum circuit control of a quantum circuit;

reducing a number of controls of the quantum circuit by excluding a first computation-uncomputation pair of operations from the quantum circuit control and without excluding a second computation-uncomputation pair of operations from the quantum circuit control, whereby obtaining a reduced control sequence, wherein said reducing the number of controls comprises selecting between reducing the first computation-uncomputation pair and between reducing the second computation-uncomputation pair based on an optimization of a score of the reduced control sequence in comparison to a score of an alternative reduced control sequence in which the second computation-uncomputation pair of operations is reduced and the first computation-uncomputation pair of operations is not reduced, wherein the score is determined based on a score of each operation in a respective quantum circuit control; and outputting a quantum circuit with the reduced number of controls of the quantum circuit.

15. A computer program product comprising a non-transitory computer readable storage medium retaining program instructions, which program instructions when read by a processor, cause the processor to perform a method comprising:

obtaining a sequence of quantum operations, each operation is a tuple of a gate and an ordered sequence of qubits on which the gate operates, the sequence of quantum operations defines a complete order between the quantum operations, the quantum operations comprise at least two computation-uncomputation pairs of operations separated by a sub-sequence of one or more quantum operations, the sequence of quantum operations is part of a quantum circuit control of a quantum circuit;

reducing a number of controls of the quantum circuit by excluding a first computation-uncomputation pair of operations from the quantum circuit control and without excluding a second computation-uncomputation pair of operations from the quantum circuit control, whereby obtaining a reduced control sequence, wherein said reducing the number of controls comprises selecting between reducing the first computation-uncomputation pair and between reducing the second computation-uncomputation pair based on an optimization of a score of the reduced control sequence in comparison to a score of an alternative reduced control sequence in which the second computation-uncomputation pair of operations is reduced and the first computation-uncomputation pair of operations is not reduced, wherein the score is determined based on a score of each operation in a respective quantum circuit control; and outputting a quantum circuit with the reduced number of controls of the quantum circuit.

* * * * *